Figure 1:
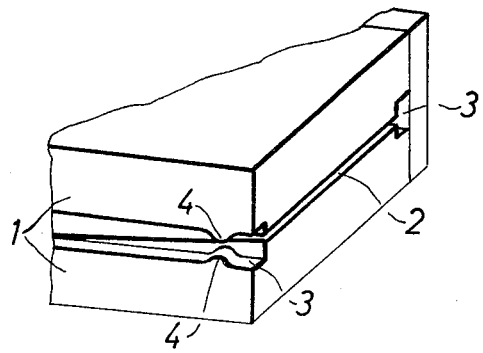

Sept. 20, 1966          H. ZYGAN          3,273,202
APPARATUS FOR MANUFACTURING THERMOPLASTIC
FOILS WITH BEADED EDGES
Filed July 2, 1963

INVENTOR.
HIERONYMUS ZYGAN
BY
Burgess, Dinklage + Sprung
ATTORNEYS

United States Patent Office 3,273,202
Patented Sept. 20, 1966

3,273,202
APPARATUS FOR MANUFACTURING THERMOPLASTIC FOILS WITH BEADED EDGES
Hieronymus Zygan, Leverkusen, Germany, assignor to Farbenfabriken Bayer Aktiengesellschaft, Leverkusen, Germany, a German corporation
Filed July 2, 1963, Ser. No. 292,363
Claims priority, application Germany, July 9, 1962, F 37,267
2 Claims. (Cl. 18—12)

Slot die with lips having recesses corresponding to the profile of the article being extruded have become known for the manufacture of thermoplastic foils by the extrusion process. In particular, flat sheeting dies having a smooth continuous marginal groove on each side of the slot are known for the extrusion of foils with beaded edges. It is only in exceptional cases that it is possible to extrude a foil with a straight and smooth beaded edge with such dies. The reason for this is that the thermoplastic material is delivered much more rapidly from the marginal grooves than from the slot which lies between the two grooves and which forms the foil itself. The resulting product is a foil having a beaded edge which is twisted spirally or in a wavy line.

A straight bead can be obtained only by increasing the delivery rate from the slot above the delivery rate for the bead. The great disadvantage of this method is that the foil itself and the bead are drawn out by different amounts, the foil is reduced in width by being pulled out and its thickness is uneven near the beaded edges. Furthermore, it is difficult to obtain constant and reproducible results. A die has therefore also been proposed in which each marginal groove may be closed to a greater or less extent by two members which bear against the outflow end of the groove from outside for the purpose of adjusting the height and width of the bead.

None of these measures overcomes the cause of the difficulties in extruding lengths of foil with beaded edges. These difficulties are caused by the disturbance of the uniform flow in a flat sheeting die when marginal grooves are provided in the lips of the die for the purpose of producing beads along the edge of the foil. It will readily be seen that the resistance to the flow through these grooves is less than the flow through the main portion of the slot due to the increased cross-section at the edges of the slot necessary to form the grooves. Firstly, this causes excessive outflow velocity of the material forming the beads and secondly, as a consequence of this, the material flowing through the parts of the actual slot immediately adjacent to the marginal grooves will not flow out parallel to the desired direction of extrustion but will be bent laterally towards the two grooves. Another consequence of this is that the outflow velocity through the actual slot of the die is very low near the two recesses so that when the draw-off speed is constant over the whole width of the foil, as is necessary, the foil will be thinner in those regions where the outflow velocity is very low, so that it will not be suitable for further treatments.

The solution of this problem is based on the realization that although the marginal grooves are necessary for forming the beaded edges, the grooves must be so formed that, at least in the direct vicinity of the outlet of the die, the thermoplastic material will flow out at a uniform velocity both through the marginal grooves and through the actual slot. This is possible because the form and dimensions of the bead are determined only by the form and dimensions of the groove directly at the outlet whereas the outflow velocity of the material for the bead is determined by the form and dimensions of the groove over its whole length (viewed in the direction of flow).

A process and an apparatus in the form of a flat sheeting die is now proposed in which a foil of thermoplastic material extruded from the die encounters one or more restrictions situated at the margins shortly prior to the outlet from the die but still inside the die, so that a uniform low velocity is obtained at the die outlet itself, both at the edges and over the whole width of the foil. In this die, the form and dimensions of the beads are determined by the form and dimensions of the grooves directly at the die outlet whereas the velocity with which the material for the beads leaves the die can be adjusted by the type and magnitude of restrictions, independently of the dimensions of the beads. In particular, the velocity of outflow of the beads may be chosen so that it is equal to the outflow velocity of the foil itself. This separation of two effects at the marginal grooves is an essential factor for producing satisfactory foils.

The restrictions are preferably rounded in shape and they may be rigidly fixed or replaceable or adjustable during the extrusion process. If desired, they may be manufactured integrally with the lips of the die so that it is no longer necessary to work a continuous marginal groove into the die; instead, the form and dimensions of the recesses may be so chosen that the required restrictions or the obstruction required for the reasons described above are thereby obtained. Foils produced with these dies have properties which make them particularly suitable for further processes. Polyamides, polycarbonates, polystyrene and polyvinyl chloride and their copolymers as well as high molecular weight polyolefines, polyurethanes, polyesters and generally all thermoplastic materials may be used as thermoplastic materials.

Figure 2:
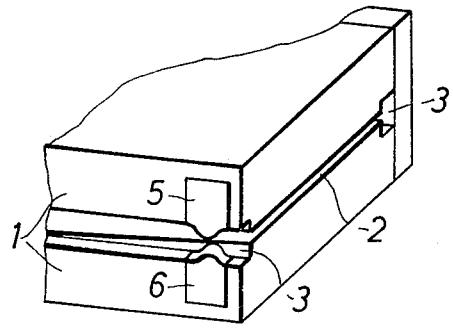
Figure 3:
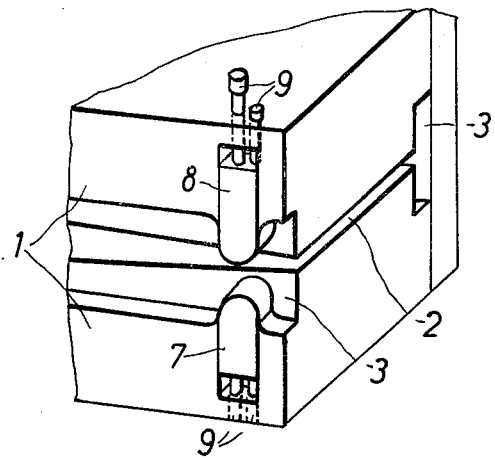

FIGURES 1, 2, and 3 show, by way of example, constructions of the apparatus in the form of a flat sheeting die for carrying out the process.

FIGURE 1 shows the outlet end of a die 1 which has a slot 2. Marginal grooves 3 are provided with restrictions 4 which are integrally incorporated with the grooves and situated just before the outlet end of the die 1.

FIGURE 2 shows the outlet end of a die 1 having a slot 2 and marginal grooves 3 which have restrictions 5, 6 in the form of replaceable inserts.

FIGURE 3 shows the outlet end of a die 1 having a slot 2 and marginal grooves 3 which contain restrictions 7, 8 which are movably mounted and may be adjusted by the screws 9.

A flat foil of polycarbonate, 30 cm. wide and 0.5 mm. thick over its whole width and having smooth marginal beads each 3.0 mm. wide and 4.3 mm. high arranged symmetrically with respect to the plane of the foil was produced with an apparatus in the form of a flat sheeting die as described above. In another case, a flat foil of polyamide 30 cm. wide and 0.28 mm. thick with marginal beads 2.6 mm. wide and 3.6 mm. high was obtained. The desired properties of the foils were uniform over the whole width of the foil in each case.

From the foregoing, it can be seen that the process of the instant invention for manufacturing foils of thermoplastic materials with beaded edges involves the extrusion of a thermoplastic material through a flat sheeting die 1, and maintaining the outflow velocity through said die 1 of the beaded edges extruded from the grooves 3 equal to the outflow velocity of the whole foil, i.e. the central web portion of the foil created by the slot 2 and the beaded edges of the foil created by the grooves 3 are extruded at a uniform rate. This is accomplished by means of marginal grooves 3 containing just prior to their outlet, at least one restriction for facilitating maintenance of required beaded edge outflow velocity.

For this purpose, the apparatus according to the invention provides a die 1 having a slot passage 2 for extruding the web portion of the foil, and a pair of marginal groove passages 3 adjoining the slot passage 2 and disposed in communication therewith for extruding the beaded edge portions of the foil. In addition, the apparatus provides at least one flow restricting member, such as either of the members 4, 5, 6, 7 or 8 disposed for extension into each of the groove passages 3 between the inlet and outlet thereof, said restricting members 4, 5, 6, 7 and 8 serving to maintain the outflow velocities of thermoplastic material extruded through the outlets of the groove passages 3 equal to each other and to the outflow velocity of the thermoplastic material extruded through the outlet of the slot passage 2. In this way, the web and beaded edge portions of the foil are extruded at a uniform rate, and the dimensions of the extruded web and beaded edge portions are established independently of extrusion outflow velocity by the outlet dimensions of the slot and groove passages 2 and 3 respectively.

The restricting members 4 shown in FIG. 1 are integrally constructed with the die 1, whereas the restricting members 5, 6, 7 and 8 illustrated in FIGS. 2 and 3 are separately constructed and are thus replaceable in the die 1.

The restricting members 7 and 8, in addition to being replaceable, are also disposed for limited movement with respect to their associated groove passages 3, and with respect to each other, by means of adjustment screws 9, so that the degree of restriction to the flow of thermoplastic material through the groove passages 3 can be easily adjusted.

To provide a type of flow restriction in the groove passages 3 which is more streamlined, the restricting members 5, 6, 7 and 8 are provided with smoothly contoured bulbous end portions that extend into the groove passages 3.

Preferably, the restricting members 4, 5, 6, 7 and 8 are provided in pairs, with at least one pair of oppositely disposed restricting members 4, 5, 6, 7 or 8 being provided for each groove passage 3.

I claim:

1. An apparatus for the manufacture of foils of thermoplastic material with beaded edges, which comprises a die for extruding a foil having a central web portion and a pair of oppositely disposed beaded edge portions, said die having a slot passage for extruding said web portion and a pair of marginal groove passages adjoining said slot passage and disposed in communication therewith for extruding said beaded edge portions, and a pair of oppositely disposed flow restricting members for regulating the outflow velocity of thermoplastic material extruded through each groove passage, each flow restricting member in each pair thereof having a smooth contoured bulbous portion disposed for extension into its associated groove passage to maintain the outflow velocities of thermoplastic material extruded through the outlets of each of said groove passages equal to each other and to the outflow velocity of thermoplastic material extruded through the outlet of said slot passage whereby the beaded edge portions and the web portion of said foil are extruded at a uniform rate, and the dimensions of said extruded web and beaded edge foil portions are established independently of extrusion outflow velocity by the outlet dimensions of said slot and groove passages.

2. The apparatus according to claim 1 wherein each pair of said flow restricting members are disposed for limited movement with respect to their associated groove passages to adjust the degree of restriction to the flow of thermoplastic material therethrough, and including screw means for adjusting the position of said restricting members in each pair thereof relative to each other and to their associated groove passage.

References Cited by the Examiner

UNITED STATES PATENTS

| | | | |
|---|---|---|---|
| Re. 12,685 | 8/1907 | Reynolds | 264—177 |
| 2,686,931 | 8/1954 | Knox. | |
| 2,712,155 | 7/1955 | Nelson. | |
| 3,072,962 | 1/1963 | McDermott et al. | 264—177 |

FOREIGN PATENTS 212,229  1/1958  Australia.

ROBERT F. WHITE, *Primary Examiner.*

S. A. HELLER, *Assistant Examiner.*